United States Patent [19]

Flodin et al.

[11] Patent Number: 5,143,791

[45] Date of Patent: Sep. 1, 1992

[54] METHOD FOR TREATMENT OF CELLULOSE FIBRES AND PRODUCTION OF COMPOSITE MATERIALS OF THE TREATED CELLULOSE FIBRES IN COMBINATION WITH RESINS

[75] Inventors: Per Flodin, Hovas; Pawel Zadorecki, Onsala, both of Sweden

[73] Assignee: Polyrand AB and Polycell Kompositer, Hovas, Sweden

[21] Appl. No.: 826,686

[22] PCT Filed: Mar. 19, 1985

[86] PCT No.: PCT/SE85/00125

§ 371 Date: Jan. 15, 1986

§ 102(e) Date: Jan. 15, 1986

[87] PCT Pub. No.: WO85/04200

PCT Pub. Date: Sep. 26, 1985

Related U.S. Application Data

[63] Continuation of Ser. No. 638,032, Jan. 7, 1991, abandoned, which is a continuation of Ser. No. 300,236, Jan. 23, 1989, abandoned, which is a continuation of Ser. No. 802,206, Nov. 19, 1985, abandoned.

[30] Foreign Application Priority Data

Mar. 9, 1984 [SE] Sweden .............................. 8401500

[51] Int. Cl.$^5$ .................. D06M 13/322; C08J 5/06
[52] U.S. Cl. .................................. 428/481; 8/190; 427/389.9; 427/394
[58] Field of Search .............. 428/481; 8/190; 427/389.9, 394

[56] References Cited

U.S. PATENT DOCUMENTS

| 2,632,744 | 3/1953 | Howald | 428/481 |
| 2,892,674 | 6/1959 | Sause et al. | 8/190 |
| 3,057,675 | 10/1962 | Hiestand et al. | 8/190 |
| 3,104,935 | 9/1963 | Moyse | 8/190 |
| 4,572,859 | 2/1986 | Fushiki et al. | 428/481 |

FOREIGN PATENT DOCUMENTS

| 1344991 | 10/1963 | France | 428/481 |
| 39-14644 | 7/1964 | Japan | 8/190 |
| 54-30999 | 3/1979 | Japan | 8/190 |
| 56-69159 | 6/1981 | Japan | 428/481 |
| 960055 | 6/1964 | United Kingdom | 428/481 |

*Primary Examiner*—Ronald W. Griffin
*Attorney, Agent, or Firm*—Cushman, Darby & Cushman

[57] ABSTRACT

Method of treating cellulose fibers wherein the fibers are treated with a composition containing a reagent A-B-X based on cyanuric chloride (A) in which one of the three chlorines has been reacted with an amine or hydroxyl compound (B-X). The reagent reacts under alkaline conditions with cellulose hydroxyl groups. A resin, e.g., polyester or vinyl resin, is then reacted with the thus modified cellulose fibers through the B-X substituent.

4 Claims, No Drawings

METHOD FOR TREATMENT OF CELLULOSE FIBRES AND PRODUCTION OF COMPOSITE MATERIALS OF THE TREATED CELLULOSE FIBRES IN COMBINATION WITH RESINS

This is a continuation of Application Ser. No. 07/638,032, filed on Jan. 7, 1991, now abandoned, which is a continuation of Ser. No. 07/300,236, filed Jan. 23, 1989, now abandoned, which is a continuation of Ser. No. 06/802,206, filed Nov. 19, 1985, now abandoned.

BACKGROUND OF THE INVENTION

Cellulose fibres have since long ago been used as reinforcement in laminates, compression moulding compounds and the like in combination with resins based on formaldehyde, for example phenol-formaldehyde-, melamine-formaldehyde- and urea-formaldehyde resins. It has not been possible to combine other resins such as polyester- and epoxi resins with cellulose fibres so that a reinforcement effect has been acheived. However cellulose, wood powder etc. have been used as filling materials for making the material cheaper.

Cellulose fibres have very good inherent tensile properties. The E-module for cellulose I is about 140 GPa, which makes the material to one of the strongest. For cellulose II the theoretic module is 90 GPa. Regenerated cellulose fibres are manufactured with a module of 48 GPa, while cotton has a module of 5-11 GPa. As a comparisson it can be mentioned that E-glass fibres have an E-module of 70 GPa. With regard to the high density of glass fibres, i.e. if the specific modules are compared, cellulose fibres are well comparable with glass fibres. Besides the break elongation is higher for cellulose and the price is lower.

The main volume of composite materials are today manufactured with glass fibres as reinforcement. The glass fibre per se is not compatible (i.e. is not wetted) with polyester resins but is always treated in order to improve wetting and preferably provide chemical (covalent) bond between fibre and matrix. Such a bond gives optimal mechanical properties to the composite material. It is common that the glass fibres are treated with a vinyl silane which gives a surface with projecting vinyl groups. These can copolymerize with the polyester resin and accordingly give a convalent bond between the fibre and the matrix. A corresponding treatment of cellulose fibres is however not practiced.

In the Swedish patent No. 6809101-6 (publication No. 372.533) is described a method of manufacturing a cellulose polymer with dihalogene-s-triazinyl groups bonded thereto. At the method cellulose having free hydroxyl groups, i.e. has been reacted with an alkaline acting agent, is treated with a cyanuric halide while maintaining an acid pH. With this method large amounts of reagent is required, in the stated examples the same amount by weight of reagent as cellulose. The yield is in spite of this poor. This depends on the fact that the reagent, which is added dissolved in acetone, has reacted with the hydroxyl groups in the water solution, which thus competes with the hydroxyl groups of the cellulose. The method is therefore not economically justifiable on a large scale.

SUMMARY OF THE INVENTION

The object of the present invention is to provide a method for treatment of cellulose fibres, so that these are given a hydrophobic surface and for example are wetted by certain resins in order to be combined with these for manufacture of composite materials, in which the resin makes the matrix of the composite and the fibres make the reinforcement. The method shall be simple to perform and give a high yield.

This has been attained by the fact the fibres in the first step are treated with a solution, dispersion or melt containing a reagent having the general formula

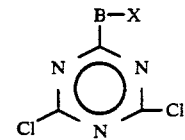

where B-X is a hydroxyl compound or an amine, at which
1) X is at least one alkyl-, aryl- or aryl alkyl chain, or
2) X is at least one chain having at least one polymerizable double bond, which e.g. originates from an acrylic group, methacrylic group, allyl compound etc., and then in a second step are treated with an alkaline acting agent and that at the same time or in connection herewith a heat treatment is performed.

The invention also concerns composite materials manufactured by the treated cellulose fibres in combination with resins, especially such where the matrix and the fibres are combined with covalent bonds.

DESCRIPTION OF THE INVENTION

The reagents which have been used can be considered to comprise three parts A-B-X, where A is the group which is bonded to the cellulose, B is the compatibilizing part and X can be the part reacting with the matrix. The reagents are based on cyanuric chloride (A) (the bromide and fluoride could also possibly be used), in which one of the three chlorine atoms has been reacted with an amine or hydroxyl compound (B-X). The reagent reacts under alkaline conditions with hydroxyl groups under formation of ethers. The reaction is illustrated by the formula below:

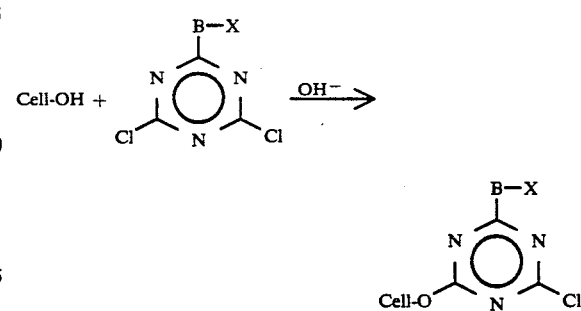

Cell-OH denotes hydroxyl groups in cellulose fibres. It could be fibres in the form of paper pulp, paper, pile fabric (non woven), regenerated fibres (continuous or staple fibres) or long vegetable fibres such as cotton, jute, flax etc. Pulp and paper can be bleached or unbleached sulphite- or sulphate pulp, thermo mechanic pulp of different types, waste pulp etc.

The reaction is perferably performed in two steps. In the first step the reagent A-B-X is added to the cellulose as a solution in an organic solvent, as a dispersion in water or in melted condition. This can be made by diping paper in the solution, by letting a continuous path pass through a bath, through spraying or by another in this technique used method for adding a liquid agent to a continuous path. Then the solvent or the dispersion medium is removed for example by letting the path pass through a drying oven.

In the second step an alkaline acting agent is added. This can be made in a similar way as when adding the agent by dipping, spraying etc. The reaction is performed at a raised temprature by heating the material in an oven, on a roll, through IR-radiation, by microwaves etc. The duration of stay in the oven depends on the temperature in the same way as other chemical reactions and can vary from a few seconds to 60 minutes. The temprature can be from 50° to 120° C. the reaction can be performed continuousely or batchweise. In the later case a continuous path can be wound up on the roller which is inserted into an oven.

An alternative performance of the second step is that the cellulose material is passed through a bath with an alkaline acting agent. The temperature of the bath should be from 50° to 90° C. and the time can vary from a few seconds to some minutes. The concentration of the alkaline bath can vary from 0.05 to 1% by weight. At such process no subsequent heat treatment is needed. The temperature at the second step is chosen so that the fuse point of the reagent used is exceeded.

The reagents can be divided in two main groups after their effect on the cellulose fibres. In the first group X consists of at least one alkyl-, aryl, or arylalkyl chain and can be illustrated by the formulas:

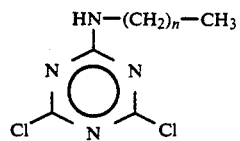

where n preferably = 1-18, but longer chains may of course also be used

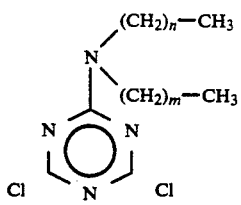

where n, m preferably = 1-18

As mentioned above X can also consist of at least one aryl- or arylalkyl chain.

When treating cellulose fibres with this types of reagents a hydrophobation of the fibres is provided. The hydrophobation facilitates the wetting of the fibres by liquid resins and reduces the water absorbtion of the composite material.

With the other group of the reagents which can be illustrated by

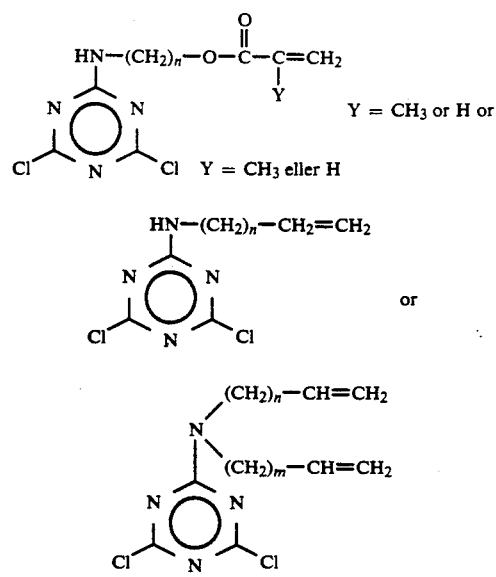

is provided that the treated cellulose fibres are wetted by unsaturated polyester resins and vinyl ester resins and are bonded covalent to this during the polymerization (curing). This can be made through the polymerizable double bond in the amine- or hydroxide group.

MANUFACTURE OF COMPOSITE MATERIALS

The treated cellulose is combined with the resin, which shall make the matrix in the composite material. The resin can be an unsaturated polyester dissolved in styren, methyl metacrylate or another monomer, a vinyl ester dissolved in styrene or other monomers and similar systems. The unsaturated polyester can be composed in many different ways but the composition must be adapted to the cellulose surface or to the contrary so that a wetting is provided. The manufacture of polyesters with properties adapted for different applications is well-known technique. We have mainly used polyestes with maleic acid and/or fumaric acid as unsaturated acid, phatalic acid as saturated acid and propylene glycol and/or ethylene glycol as alcohol component.

The combination of cellulose fibres with resin can be made in many ways which are known from the technique for manufacture of composite materials. Thus paper can be impregnated with a resin as is made at the manufacture of paper liminate. Continuous fibres can be dipped or coated alternatively cut and mixed with resin as is made in the spraying method.

The curing of the laminate can be performed at low or high temperatures depending on the initiator system which has been added to the resin before the combination with the fibres. It is made in a common way in moulds, for example in presses. The SMC-technique may be used as well as the compression moulding compound technique.

The composite materials manufactured according to the invention have mechanical properties which are well comparable with glass fibre reinforced polyester materials. Besides the density of the cellulose is lower than for glass, and therefore a piece with a certain volume amount of cellulose as reinformcement has a lower weight than one having the same volume amount of glass fibres.

EXAMPLE 1

Sheets of cellulose fibres in the form of bleached sulphate pulp with the weight by area of 100 g/m² were impregnated with 0.5% chloroform solution of a compound having the formula

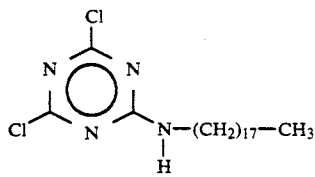

After air drying the sheets were treated with 0.05M NaOH followed by heat treatment at 90° C. in 30 minutes. After washing with water and acetone the sheets were dried in air.

The contact angle of water on paper was defined according to

RESULT

|  | Amount of reagent | Contact angle |
| --- | --- | --- |
| Paper, untreated | 0 | 0 |
| Treated paper | 0.1% | 120° |

EXAMPLE 2

Sheets having the weight by area of 100 g/m² of cellulose fibres in the form of bleached sulphate pulp were impregnated with 2% acetone solution of a compound having the formula

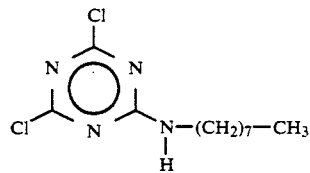

After air drying the sheets were treated with 0.1M NaOH followed by heat treatment at 90° C. in 30 minutes. After washing with water and acetone the sheets were dried in air. The contact angle between paper and water was 118°, defined according to SCAN-p18:66.

Five sheets of the modified fibres were impregnated in vacuum with a commercial polyester. Norpol PI 2614 with 40% styrene with 2% bensoyl peroxide as initiator. Five sheets were laid on the top of each other and were placed in a mould and cured in a hot press at 80° C. in 60 minutes under 10 tons pressure. Subsequent curing was performed during 23 hours at 90° C.

The mechanical properties and the water absorption of the composite material were determined. A reference sample was made in exactly the same way with untreated fibres.

| Type of reinforcement | Water absorption |
| --- | --- |
| non-modified bleached sulphate pulp | 12.8% |
| modified according | 9.0% |

| Type of reinforcement | Water absorption |
| --- | --- |
| to the invention | |

EXAMPLE 3

Cellulose fibres of bleached pine sulphate in the form of sheets having the weight by area of 40 g/m² were impregnated with a 5% acetone solution of a reagent having the formula

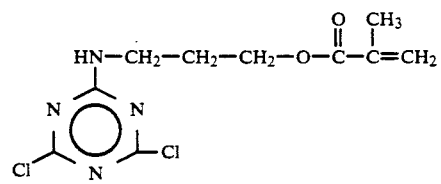

After drying in air the sheets were treated with 0.2M NaOH and heated 30 minutes to 90°. After washing with water and acetone the sheets were dried in air.

A composite material was manufactured by impregnating sheets in vacuum with an unsaturated poyester of the type Norpol PI 2614 from Jotun. It contained 40% styrene and 2% bensoyl peroxide. Ten impregnated sheets were laid on the top of each other and were cured in a hot press at 80° i 60 minutes under a pressure of 10 tons.

The mechanical properties of the composite and the water absorption were determined. A reference sample was made in exactly the same way with untreated paper. By the fact that vacuum was used both samples became transparent. The results can be seen from the table:

| Type of reinforcement | Amounts of fibres based on the composite | Tensile strength (MPa) | Appearance after stress | water absorption | appearance after drying |
| --- | --- | --- | --- | --- | --- |
| Non-modified pine sulphate | 45% by weight | 78.1 | white | 12.8% | white |
| Pine sulphate pulp modified according to the invention | 45% by weight | 93.2 | unchanged transparent | 7.9% | unchanged transparent |

EXAMPLE 4

Sheets having the weight by area of 100 g/m² of cellulose fibres in the form of cotton linters were impregnated with a 5% acetone solution of a compound having the formula

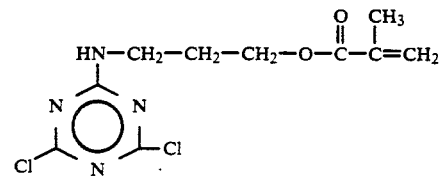

After air drying the sheets were treated with 0.2 m NaOH followed by heat treatment at 90° i 30 minutes in N₂-atmosphere. After washing with water and acetone the sheets were dried.

Five sheets of the modified fibres were impregnated with commercial polyester. Norpol 7200 with 40% styren. containing 1% methyl ethyl ketone peroxide and 1% cobalt naphtenate as initiator system. In order to avoid air bubbles in the laminate the impregnation was performed in vacuum. 5 sheets were stapled and cured through pressing.

| Type of reinforcement | Amounts of fibre based on the composite | Tensile strength | Appearance after stress | Water absorption | Appearance after drying |
|---|---|---|---|---|---|
| Untreated cotton linters | 30% | 66 MPa | white | 6.5% | white |
| Cotton linters treated according to the invention | 30% | 70 MPa | unchanged transparent | 4.8% | unchanged transparent |

EXAMPLE 5

Sheets of cellulose fibres in the form of bleached sulfate pulp and having the weight by area of 100 g/m² were impregnated with 7% acetone solution of a compound having the formula

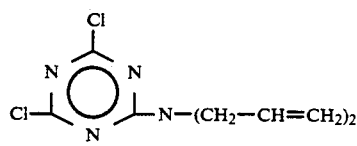

After air drying the sheets were treated with 0.2 m NaOH followed by heat treatment at 90° C. in 30 minutes. After washing with water and acetone the sheets were dried in air.

Five sheets of the modified fibres were impregnated with the commercial polyester. Norpol PI 2614 with 40% styren. with 2% bensoyl peroxide as initiator. Five sheets were laid on top of each other and after degassing in vacuum they were placed in a mould and cured in a hot press at 80° C. in 60 minutes under a pressure of 10 tons. After curing were performed in 23 hours at 90° C.

The mechanical properties and the water absorption of the composite material were determined. A reference sample was performed in exactly the same way with untreated fibres. The paper sheets were anisotrope. Test were performed in the paper machine direction. The results can be seen in the table.

| Type of reinforcement | Amounts of reinforcement | Tensile strength (MPa) | Appearance after stress | Water absorption | appearance after drying |
|---|---|---|---|---|---|
| Non-modified bleached supphate pulp | 46% | 117.9 MPa | white | 13.2% | white |
| bleached sulphate pulp modified according to the invention | 46% | 127.5 MPa | unchanged transparent | 8.7% | unchanged transparent |

As can be seen of the measurement results (unchanged transparent appearance after load) a good adherance between the fibres and the matrix is acheived, which prevents separation of the fibres from the matrix during strain. The mechanical properties (tensile strength) in wet and dry condition were improved as compared to the results acheived with untreated fibres. The water absorption was lower, and the appearance was unchanged transparent after water exponation.

We claim:

1. A method of treating cellulose fibres and forming a composite therefrom which comprises
   (1) impregnating the fibres with a solution, dispersion or melt of a compound having the formula:

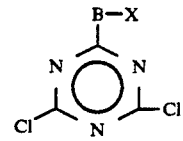

wherein B-X is selected from the group consisting of

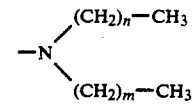

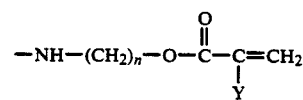

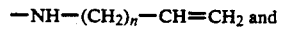

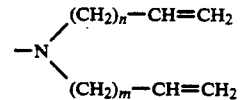

wherein n and m stand for an integer of from 1 to 18 and Y is CH₃ or H;
   (2) thereafter treating the impregnated fibres with aqueous alkali and heat treating at a temperature at or above the fusion point of said compound whereby said compound is reacted through its Cl substituent with cellulose hydroxy;
   (3) thereafter washing and drying;
   (4) then impregnating the thus modified cellulose fibres with a resin; and
   (5) curing the resulting product to form said composite.

2. A method of treating cellulose fibres and forming a composite therefrom which comprises (1) impregnating the fibres with a solution, dispersion or melt of a compound having the formula:

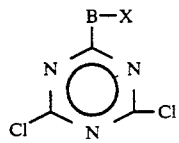

wherein B-X is selected from the group consisting of

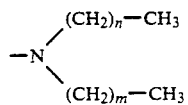

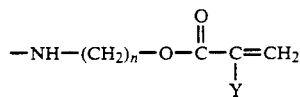

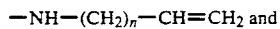

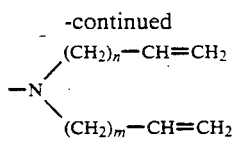

wherein n and m stand for an integer of from 1 to 18 and Y is $CH_3$, or H;

(2) thereafter treating the impregnated fibres with aqueous NaOH and heat treating at a temperature of from 50° to 120° C. and at or above the fusion point of said compound whereby said compound is reacted through its Cl substituent with cellulose hydroxy;

(3) thereafter washing and drying;

(4) then impregnating the thus modified cellulose fibres with a polyester or vinyl resin; and (5) curing the resulting product to form said composite.

3. The method of claim 2 wherein B-X is selected from the group consisting of

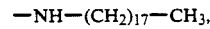

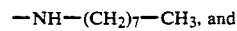

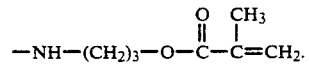

4. The composite formed by the method of claim 2 wherein the resin is a polyester resin covalently bonded to said fibres through the group—X by means of a polymerizable double bond in X.

* * * * *